(12) United States Patent
Nitschke

(10) Patent No.: US 8,707,697 B2
(45) Date of Patent: Apr. 29, 2014

(54) SYSTEM INTEGRATION TO PRODUCE CONCENTRATED BRINE AND ELECTRICITY FROM GEOPRESSURED-GEOTHERMAL RESERVOIRS

(76) Inventor: George Nitschke, New Ipswich, NH (US)

( * ) Notice: Subject to any disclaimer, the term of this patent is extended or adjusted under 35 U.S.C. 154(b) by 650 days.

(21) Appl. No.: 12/653,047

(22) Filed: Dec. 8, 2009

(65) Prior Publication Data

US 2010/0258251 A1    Oct. 14, 2010

Related U.S. Application Data

(60) Provisional application No. 61/201,088, filed on Dec. 8, 2008.

(51) Int. Cl.
*F03G 4/00*    (2006.01)

(52) U.S. Cl.
USPC .......................................... 60/641.2; 60/648

(58) Field of Classification Search
USPC ................... 60/641.2, 648; 159/48.1; 290/52; 166/267
See application file for complete search history.

(56) References Cited

U.S. PATENT DOCUMENTS

| | | | | |
|---|---|---|---|---|
| 4,152,898 A * | 5/1979 | Awerbuch | .................... | 60/641.5 |
| 4,719,759 A * | 1/1988 | Zaslavsky | .................... | 60/641.8 |
| RE36,282 E * | 8/1999 | Nitschke | .................... | 60/641.2 |
| 5,946,941 A * | 9/1999 | Sinelnikov | .................... | 62/613 |
| 7,251,944 B2 * | 8/2007 | Holtzapple et al. | .................... | 62/93 |
| 2007/0207082 A1* | 9/2007 | Lee et al. | .................... | 423/499.4 |
| 2008/0083605 A1* | 4/2008 | Holtzapple et al. | .................... | 203/11 |

* cited by examiner

*Primary Examiner* — Thomas Denion
*Assistant Examiner* — Shafiq Mian
(74) *Attorney, Agent, or Firm* — Bay State IP, LLC

(57) ABSTRACT

A systems design is disclosed which converts Geopressured-Geothermal (GPGT) brine into saturated brine in concert with the production of electricity from GPGT brine energy. The design integrates a GPGT conversion system which super-concentrates a portion of the GPGT brine, utilizing that portion's thermal energy, with a system designed to produce electricity from the remainder of GPGT brine energy. The end-brine from the electricity producing system is concentrated (sub-saturated) in a spray evaporation pond, which serves as a heat sink for both systems, and is combined with the super-saturated product brine from the GPGT conversion system, resulting in a saturated brine end-product. The saturated brine can be used for beneficial purposes, including for use as bulk material in the construction of salinity gradient solar ponds (SGSP), which collect, store, and deliver solar thermal baseload power (e.g., for electricity generation).

5 Claims, 5 Drawing Sheets

Integrated System for Concentrating GPGT End-Brine

Figure 5:
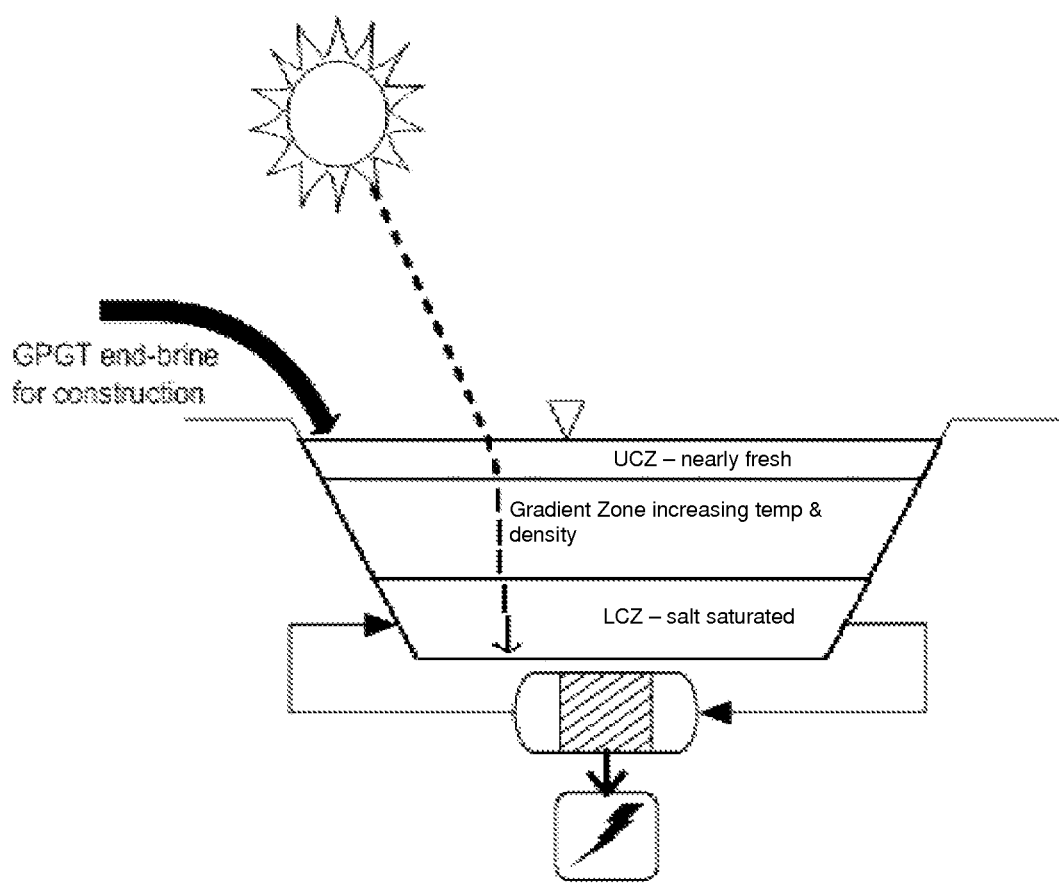

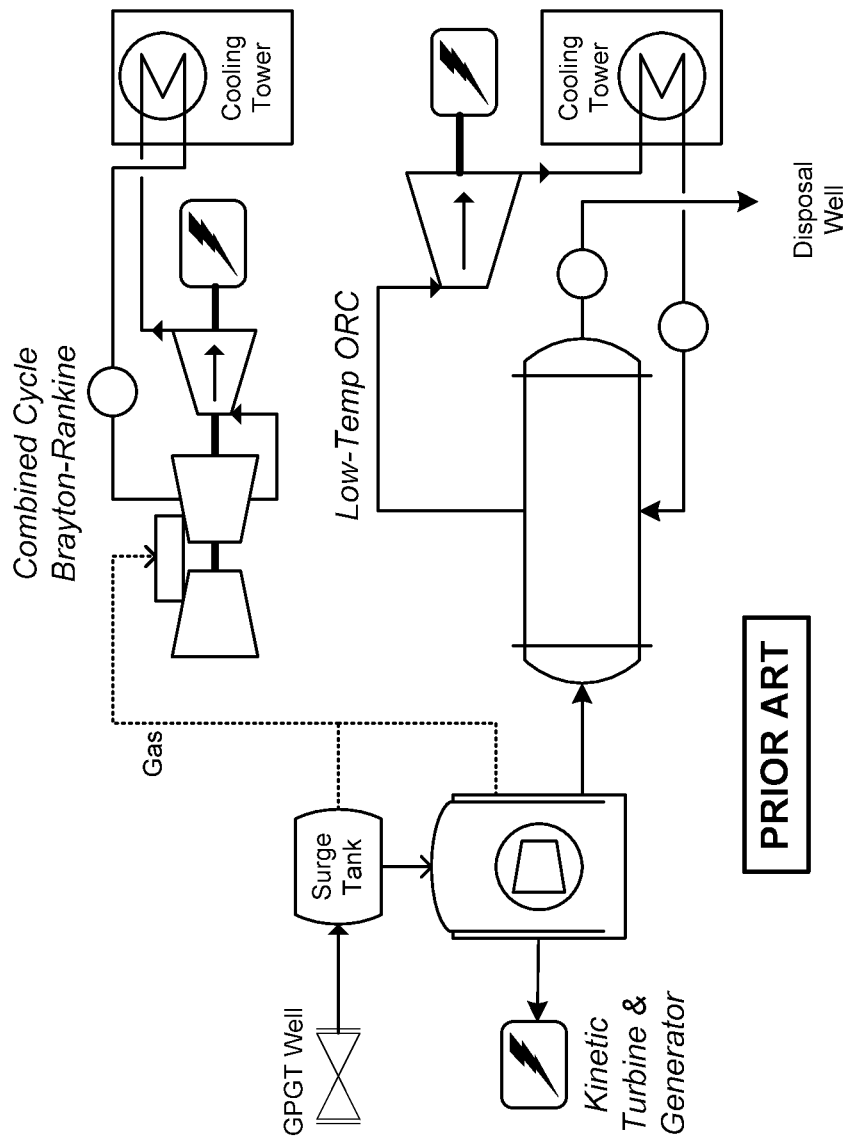
Figure 1 Notional Hybrid Cycle for converting GPGT-to-Electricity

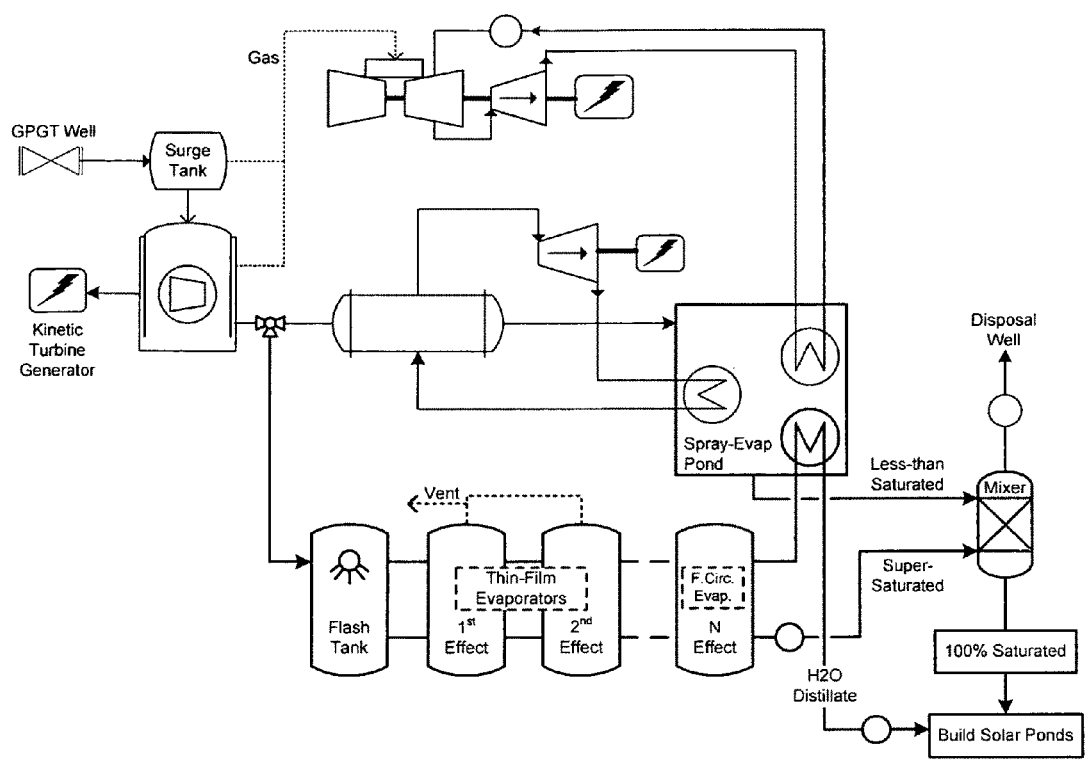
Figure 2: Integrated System for Concentrating GPGT End-Brine

Figure 3

Table I: Comparison of Costs/Performance for Present Invention vs. GPGT-Electricity Solely

|  | Figure 1 GPGT-Elect Only | Figure 2 Present Invention |
|---|---|---|
| mass rate split (pps) Top/Bottom | 105.6 / 0 | 55.44 / 50.16 |
| generated: 87.5% kinetic turbine (kW) | 738 | 738 |
| power generated: 42% combined cycle (kW) | 2587 | 2587 |
| power generated: 10% low-temp ORC (kW) | 1329 | 698 |
| parasitic power or system requirements (kW) | 700 (pump, cool twrs) | 171 (SEP system) |
| total net power output (kW, with 95% generators) | 3954 | 3852 |
| estimated loss in pwr revenue $/yr (at $0.10/kWh) | N/A | −$86,000/yr |
| est. gain in disposal costs (est. $0.25/bbl costs) | N/A | +$2,187,005/yr |
| disposal brine volume (bpd) | 25,000 | 0 |
| evaporated water from SEP (bpd) | 0 | 6036 |
| product H2O distillate (kgal/day) | 0 | 395 (9400 bpd) |
| saturated brine product (bpd) | 0 | 8800 |
| Spray Evaporation Pond footprint (acres) | 0 | 2-3 |
| SGSP footprint build per year GPGT well-life (acres) | 0 | 60 |
| SGSP acres/MWe (e.g., Duval County, TX) | N/A | 50 |
| MWe solar thermal baseload install per yr | N/A | 1.2 |

Projections based on a Pleasant Bayou No.2 similar well (Frio GPGT Fairway, Brazoria County, TX):
    [1] 25,000 bpd flow rate
    [2] 290°F brine temperature and 3000 psi flowing pressure at wellhead
    [3] 11.2 wt.% dissolved salts, mainly NaCl
    [4] 22.6 scf/bbl net gas-water-ratio (GWR), primarily CH4 with 940 Btu/scf heat value

Figure 4

Table II: Comparison of SGSP Electricity Costs with Other Renewable Energy Systems

|  | Wind | Photovoltaic | Concentrating Systems | SGSP [4] |
|---|---|---|---|---|
| Footprint kWh/yr/acre | 34,000 [1] | 152,000 [2] | 248,000 [3] | 161,000 |
| Installed Costs $/kWh/yr | $0.64 [5] | $4.34 [6] | $1.86 [8] | $0.50 (free salt) $0.78 ($15/ton salt) |
| O&M Costs $/kWh | $0.015 | $0.005 [7] | $0.007 [8] | $0.015 (large scale) |
| Baseload? | No | No | No | Yes [9] |

[1] Example: Navitas Energy, 87 1.5-MW turbines on 10,000 acres; 13 kW (peak)/acre, at 30% capacity, avg 3.9 kW/acre; note that "fetch acreage" for wind power is still available for other uses, e.g., cattle, farming
[2] Example: Nellis Solar Pwr Plant, 25E06 kWh/y, 140 acres (178,571 kWh/y/acre) 85% adjust f/ Corpus Christi, 20% duty
[3] Example: 500 MW (peak, Mojave) In-Development Solar 1, 4500 acres at 30% avg w/ 85% adjust for Corpus Christi
[4] GEM estimate for SGSP in Duval Cty TX at 20 kWe/acre using low-temp ORC with 0.92 duty factor
[5] DOE Annual Report on U.S. Wind Power Installation, Cost, and Performance Trends: 2007 (for Texas region)
[6] $7.6/W, 20% duty (Tracking the Sun: The Installed Cost of Photovoltaics in the U.S. from 1998-2007, Lawrence-Berkley)
[7] PV panel cleaning, inverter replacement; no consideration for PV panel replacement (material degradation, etc.)
[8] Solar Energy Technologies Program 2008-2012 MYPP (DOE Office of Energy Efficiency and Renewable Energy)
[9] SGSPs are both collector and storage, providing baseload power; other methods have storage costs, inefficiencies, etc.

SYSTEM INTEGRATION TO PRODUCE CONCENTRATED BRINE AND ELECTRICITY FROM GEOPRESSURED-GEOTHERMAL RESERVOIRS

CROSS REFERENCE TO RELATED APPLICATION

This application takes priority from and claims the benefit of Provisional Application Ser. No. 61/201,088 filed on Dec. 8, 2008, the contents of which are hereby incorporated by reference.

TECHNICAL FIELD OF THE INVENTION

This invention involves the production of electricity from Geopressured-Geothermal (GPGT) brines, utilizing the kinetic, thermal, and gas energy of the GPGT brine. The invention further incorporates concentrating the GPGT waste brine, from the power production, into saturated salt water for beneficial uses, including for use as bulk material in the construction of salinity gradient solar ponds. As such, the invention also involves the use of spray evaporation ponds and distillation concentration in multi-effect evaporators to concentrate the GPGT brine.

BACKGROUND OF INVENTION

The invention involves utilizing Geopressured-Geothermal energy for beneficial uses. Geopressured-Geothermal (GPGT) energy is contained in the reservoir brines of certain sedimentary basins, unlike geothermal energy which are associated with volcanic hot-rock. The GPGT reservoir brines are highly pressured and hot, with values ranging 1000 psi to 4000 psi flowing surface pressure with 250° F. to 500° F. brine temperatures. The brines are entrained with natural gas, varying 20 to 100 scf/bbl. The brines can be recovered via well-bores, at high flow rates ranging 15,000 to 40,000 bbl/day. The available energies are: (1) the mechanical energy of the high pressure flowing brine; (2) the thermal energy via heat exchange with the hot brine; and (3) the chemical energy of the natural gas which can be withdrawn from the brine in a gas separator. The GPGT brines' water and salts are additional resources. The amount of salts and minerals dissolved in the GPGT reservoir brines, or Total Dissolved Solids (TDS), varies over a wide range: 3500 to 200,000 mg/l. The TDS are comprised of mostly Sodium Chloride, with lesser amounts of Calcium, Potassium, and other trace elements.

Generally there is an inverse relationship between brine TDS and brine gas content as the solubility of gas in water decreases with increasing salinity. There are at least seven known GPGT basins in the U.S. and about 60 others worldwide (Dorfman, 1988). The largest U.S. GPGT basin is in the Gulf Coast region with the second largest in the Central Valley of California. The U.S. Department of Energy (DOE) initiated the Geopressured-Geothermal Research Program in 1974 to define the magnitude and recoverability of GPGT energy in the U.S. Under this program, five deep GPGT research wells were flow tested in the Texas-Louisiana Gulf Coast region from 1979 to 1992. These flow tests demonstrated GPGT reservoir production longevity, ranging 5 to 7 years at sustained flow rates of 20,000 to 40,000 bpd (Negus-de Wys, et al, 1990; Riney, 1991; Riney, 1993). The specifics of the GPGT reservoir drive mechanism(s) have been debated (e.g., fault-enhanced fluid communication, shale dewatering, etc.) but it's widely accepted that the GPGT basins have outperformed conventional reservoir models (Ramsthaler, et al, 1988; Riney, 1988; John, 1989). The DOE ended funding for the GPGT program in 1992 and the last of the DOE test wells was plugged in December, 1993 (Rinehart, 1994).

The production of electricity from GPGT brine energy (i.e., flowing GPGT brine from a well-bore to recover/convert the kinetic, thermal, and gas energy) has been proposed by others (see example references from the Proceedings from the Industrial Consortium for the Utilization of the Geopressured-Geothermal Resource, Idaho National Engineering Laboratory, 1990-1991; e.g., the U.S. DOE demonstration at the Pleasant Bayou No. 2 GPGT test well, 1979-1992, Brazoria County, Texas, where a hybrid system at the GPGT well-head was used to generate electricity). Projects are currently being proposed and initiated to convert GPGT brine energy to electricity, and some have received funding from DOE Grants (e.g., see conference presentations related to Geothermal Energy Utilization Associated with Oil & Gas Development from the SMU Geothermal Lab).

The invention disclosed herein does not claim uniqueness regarding the particular GPGT-to-electricity process but rather shows unique novelty for the integration of those processes with a system, which incorporates certain methods from U.S. Pat. Re. 36,282 (Nitschke, 1999) along with new modifications, that allows for the concentration and use of the waste GPGT end-brine. All of the to-date proposals for converting GPGT-to-electricity have yet to find a suitable use for the massive volumes of thermally spent, de-gassed GPGT end-brine (e.g., approximately 5000-6000 bpd per MWe for a Frio type GPGT reservoir), and ultimately dispose these large quantities of raw GPGT brine, e.g., in downhole reservoirs, often at great expense, environmental impacts, and long-term risks. The invention disclosed herein integrates with existing GPGT-to-electricity systems and utilizes the GPGT end-brine for beneficial purposes (e.g., as construction material for salinity gradient solar ponds (SGSP), which are shallow, salt-gradient ponds that collect, store, and deliver baseload solar thermal energy for electricity production, sea water desalination, process heat, etc.), thereby greatly enhancing the overall economics of the GPGT-to-electricity project while also establishing renewable energy capacity, i.e., the SGSP systems.

The multi-effect distillation (MED) technology used in this invention is widely found and also discussed in U.S. Pat. Re. 36,282 (Nitschke, 1999) and in a subsequent filing by Nitschke (August, 2007) entitled "Enhanced Oil Recovery System for use With a Geopressured-Geothermal Conversion System", which references' citations provide background for the MED technology. In U.S. Pat. Re. 36,282, Nitschke teaches producing GPGT brines through a well bore, flowing the brine to a hydraulic turbine for power generation, separating the gas, and then routing the brine to an MED unit for separating the GPGT source brine into saturated brine and distilled water end-products. In U.S. Pat. Re. 36,282, Nitschke further teaches utilizing the saturated brine end-product for the large scale construction of solar ponds.

Concerning spray evaporation technology related to the instant invention, salt recovery from sea water or brines via salt ponding, evaporation ponds for such purpose are an established practice. Typically, shallow ponds are filled with sea water and then the water is allowed to evaporate leaving behind solid sea salts that can be harvested. Spray evaporation ponds (SEP) utilize pump driven discharge nozzles exhausting over the pond surface to increase the surface area available for evaporative mass transfer; the driving potential for the mass transfer process is the difference between the vapor pressure of the discharging fluid and the water vapor pressure in the local air. Likewise, SEPs are in wide use for cooling, say, for heat rejection from power plants, although cooling towers are generally the preferred practice. Spray evaporation pond technology is also discussed by Nitschke in the subsequent August, 2007 filing ("Enhanced Oil Recovery System for use With a Geopressured-Geothermal Conversion System"). The invention disclosed herein is unique in its method of thermally charging the SEP via waste heat from a brine distillation process (i.e., per Nitschke, 2007) in combination with reject heat from power cycles utilizing GPGT brines, for the dual purpose of partially concentrating/conditioning the SEP brine waters for end-use while providing a power cycle heat-sink.

This information is noted here to the greatest import to underscore the potential, and national importance, of the invention's impact on the U.S. energy policy and portfolio, e.g., improving the economics of GPGT energy recovery and conversion, thereby enhancing the access and use of that major domestic energy resource, will help offset U.S. dependence on foreign oil (per USGS Circular 790, there are 5,700 quads of recoverable gas and 11,000 quads of available thermal energy in the Gulf Coast GPGT basin alone; U.S. total annual energy consumption is approximately 100 quads). Additionally, the method proposed herein provides for the efficient management of the GPGT brine end-salt, i.e., using it for cost-effective construction of SGSPs for large-scale production of solar thermal (baseload) energy, the lack of which (proper management of the end-salt) would inhibit full recovery of the GPGT potential. Lastly, the solar thermal renewable energy (e.g., baseload electricity) from the SGSP systems, installed via the GPGT conversion process of the present invention, approaches ~10× of that energy produced by the GPGT-electricity systems themselves, hence having the potential to provide a major portion of our nation's renewable energy portfolio.

The inventor believes the known prior art taken alone or in combination neither anticipate or render obvious the present invention. Reference to the foregoing materials does not constitute an admission that such disclosures are relevant or material to the present claims. Rather, such materials relate only to the general field of the disclosure and are cited as constituting the closest art of which the inventor is aware.

DISCLOSURE OF INVENTION

The invention disclosed herein integrates a GPGT conversion system, e.g., building on the system as taught by Nitschke in U.S. Pat. Re. 36,282, with a system(s) designed to generate electricity from GPGT brines. The system(s) designed to generate electricity is not unique to this invention but is discussed herein solely to provide context for the present invention.

Refer to FIG. 2 (discussed later) for the disclosure discussion which follows. The system begins with GPGT brine flowing from a well-bore to a means for recovering the gas and kinetic energy from the brine (depicted by a surge tank, Pelton turbine and gas separator in the figure; alternately the brine pressure may be reduced by a choke, versus by a kinetic turbine, for power recovery). After the gas is separated from the GPGT brine a portion of the brine is diverted from the electricity production components (top components in FIG. 2) to a multi-effect distillation (MED) unit. The brine is super-concentrated (beyond saturation) in the MED, which also yields low-pressure steam and H2O distillate (TDS<5 ppm). The thermally spent brine from the (upper) power branch is routed to a Spray Evaporation Pond (SEP). The reject heat from the heat engine cycle(s) in the power branch is combined with the latent heat from the condensing, low-pressure steam leaving the MED to thermally augment the spray evaporation in the SEP. In addition to providing a heat sink for the systems, the SEP serves to concentrate the GPGT end-brine from the power branch. The concentrated, but less-than saturated, brine exiting the SEP is combined with the super-saturated brine exiting the MED in a mixer to yield fully saturated salt brine, e.g., for use in large-scale SGSP installations as bulk construction material. Generally, the cost of the salt can be as much as ½ the installed costs for SGSPs (with roughly ¼ for the pond construction and liner, and ¼ for the power equipment that utilizes the SGSP thermal energy). So the integration of these systems greatly benefits both the GPGT-electricity production (avoidance of brine disposal costs, parasitic loads) and deployment of SGSP installations (cost-effective source for massive salt quantities). The energy cost to the GPGT-electricity operation, i.e., a portion of the GPGT brine thermal energy, is more than offset by the benefits. Example cost benefits for the integrated GPGT conversion are discussed in Table I, and the cost-effectively of SGSP renewable energy is summarized in Table II (both discussed below).

The currently disclosed invention is both unique and highly beneficial. For operators primarily interested in electricity production from GPGT brines, the present method enables concentrating the discharge brine for beneficial use, rather than disposing the discharge brine, thereby avoiding the cost of disposal while increasing revenues from the sale or use of the end-brine. As previously noted herein, this has great significance for the U.S. renewable energy portfolio: by providing for efficient management of the GPGT end-brine, the present invention facilitates the full recovery of the GPGT potential, a major U.S. energy resource; and the renewable energy produced from the SGSP systems, proposed for installation as a co-product of the present invention, approaches ~10× of that energy produced by the GPGT-electricity systems themselves, hence providing a major portion of our nation's renewable energy portfolio.

BRIEF DESCRIPTION OF DRAWINGS AND TABLES

FIG. 1 shows a nationalization of existing practice (proposed by others) for converting GPGT brines into electricity. The GPGT brine flows from a well-bore to a kinetic turbine (e.g., Pelton Wheel), which is used to drive a generator, and a means for separating the gas. The gas is utilized in a heat engine to generate electricity, where the exhaust heat is recovered for further energy in the cycle. A combined Brayton-Rankine cycle is depicted in the figure; however other integrated cycles could be utilized. The degassed hot GPGT brine is routed to a low-temperature heat engine for further power generation; a low-temperature Organic Rankine Cycle (ORC) is depicted in the figure but other heat engines could be utilized. In the figure, the gas-to-electricity system and the brine-thermal-to-electricity system are shown separately, however they could be integrated, e.g., utilize the GPGT brine thermal energy in the hybrid-combined cycle. The waste heat from the heat engines is shown rejected to cooling towers in the figure, and the net electricity is the combination of the produced electricity (Pelton Wheel, Combined Cycle, Low-Temp ORC) less the sum of the parasitic loads (e.g., disposal pump, cooling towers, etc.).

FIG. 2 shows the envisioned best practice of the invention disclosed herein for producing concentrated brine and electricity from GPGT brine reservoirs. The lower system components build upon the system disclosed in U.S. Pat. Re.

36,282 (Nitschke, 1999) and subsequent filing (Nitschke, August 2007) entitled "Enhanced Oil Recovery System for use With a Geopressured-Geothermal Conversion System". Those previous systems recover GPGT brine from a wellbore, convert the brine's kinetic energy to electricity in a pressure-reduction turbine/generator set while separating the gas, and concentrate the brine in an MED system. FIG. 2 shows a modification to the previously disclosed MED system in that the end-effect(s) are "Forced Circulation Evaporators" versus "Thin Film Evaporators", allowing the MED to produce super-saturated brine (up to approximately 20% suspended solids, per communication with the manufacturer). The system components in the upper "power branch" indicate notional power cycles for producing electricity from the GPGT gas and a portion of the brine. As in FIG. 1, a combined Brayton-Rankine cycle is depicted converting the gas energy into electricity, and a low-temperature ORC is shown converting the GPGT brine thermal energy into electricity. An alternate system might combine the reject heat from the gas engine with the GPGT thermal energy to produce electricity. Or other power cycles are possible for this application (e.g., with by-product of process steam, etc.), but they all have a common function of generating electricity and rejecting heat. The heat rejected from the power cycle and the latent heat of the condensing steam from the end-effect of the MED are used to promote evaporation in a spray-evaporation pond (SEP). The SEP partially concentrates the brine discharged from the power branch. The less-than-saturated brine discharge from the SEP (power branch) is mixed with the super-saturated brine from the MED to yield 100% saturated brine for beneficial use, e.g., for sale or use in the construction of SGSPs. The fraction of GPGT well-bore brine split to the lower MED branch (by the valve downstream of the kinetic turbine) is adjusted to maximize the electricity production from the upper power branch while producing the desired saturation of GPGT discharge brine from the system (e.g., for SGSP construction). Lastly the system recovers H2O distillate (TDS<5 ppm) from the MED, which likewise can be sold or used for SGSP construction (as indicated in the figure).

FIG. 3 comprises Table I which provides an example comparison of a system which only practices GPGT-to-electricity with an integrated system such as disclosed in this invention. The flow-rates and GPGT parameters are taken from test data for the DOE GPGT test well Pleasant Bayou No. 2, in the Frio Fairway, Brazoria County, Texas. The cost comparison is presented from the viewpoint of a GPGT-electricity operator, comparing using all the GPGT brine for electricity and disposing the end-brine, versus diverting approximately half the brine's thermal energy and avoiding brine disposal costs. The net cost avoidance for this example is approximately $2 million per year (using $0.25/bbl brine disposal costs offset) for the example ~4 MWe system; when factoring in O&M costs, the net impact approximately doubles revenues, for $0.10/kWh power costs).

FIG. 4 comprises Table II which provides a very important comparison of performance and cost parameters for various renewable energy methods with SGSP technology, using electricity generation for comparison. Note that SGSPs trade very favorably with respect to energy density (footprint), i.e., the energy produced annually per surface area required; this is due to the nature of the SGSPs which serve to collect, store, and deliver solar thermal energy on demand (e.g., baseload). Note in this regard SGSPs are actually are more energy-dense than PV panel systems. Note also the installed costs for the systems: for the SGSP installed per the present invention, i.e., including the capitalized costs for the MED and SEP with reasonable O&M costs to operate the GPGT conversion system, the installed costs would be approximately $0.61/kWh/yr, roughly equal to $6.17/ton salt costs (the table shows $0.50/kWh/yr for free salt and $0.78/kWh/yr for salt that costs $15/ton). Using this installed cost for SGSPs, then, they are 7× cheaper than PV systems, 3× cheaper that concentrating power systems, are roughly equal to wind power, with comparable O&M costs. Lastly note that SGSPs can deliver baseload solar thermal electricity to the grid, which is far easier for utilities, etc., to integrate than is the other (cyclic) renewables. This table summarizes the vital potential that SGSP technology has for our renewable energy portfolios, both in terms of cost and performance. Likewise the massive GPGT energy resource has the potential to be a major piece of our future energy portfolio. The present invention synergistically integrates the production and establishment of these two vital energy technologies in a cost-effective and environmentally sound manner.

FIG. 5 illustrates an example of salinitiy gradient solar pond (SGSP) technology, wherein the SGSP is comprised of three layers, as shown in the figure below: an Upper Convecting Zone (UCZ), a gradient or Non-Convecting Zone (NCZ), and a storage zone or Lower Convecting to Zone (LCZ).

BEST PRACTICE FOR CARRYING OUT THE INVENTION

The following discussion of the instant invention's systems and configuration is considered to be the most likely practice of the invention. Namely, these systems will augment a GPGT-to-electricity system, as depicted in FIG. 1, to provide concentration of the end-brine for beneficial use, as depicted in FIG. 2. The methods of the GPGT-to-electricity system are generally discussed, for context purposes, and systems descriptions as previously disclosed in Nitschke (1999, 2007) are used to provide continuity in the description, although it is acknowledged that those methods are taught and claimed elsewhere.

Some of the detailed calculations of the systems' operation and performance described herein are available with the author's published doctoral dissertation (Nitschke, 2006). The contents of that published dissertation, and the formal vetting process which it received for publication, are noted here for technical proof as necessary to substantiate the invention's proposed utility.

1. Hybrid GPGT Power Cycle

The following discussion reviews a notional depiction of the hybrid GPGT power cycle components as indicated in FIG. 1 and FIG. 2. This is not to imply that the following is the only such configuration. The discussion here is meant to provide context solely, to help disclose the envisioned best practice of the instant invention, i.e., primarily to illustrate the integration of the heat management and utilization of the end-brine versus disposing (as indicated in FIG. 1). These systems are also discussed in Nitschke 2007.

1.1. GPGT Well

The first component of the system is a producing GPGT well. Well performance data for implementation of a system in, say, the Gulf Coast region are readily available in the literature, stemming particularly from DOE GPGT testing (e.g.: Wallace, 1978; Dorfman, 1988; Negus-de Wys, 1990). The GPGT well is equipped with a control head that provides shut-in control for the GPGT well.

1.2. Surge Tank

Unprocessed brine flows from the GPGT well into a surge tank as shown in the figures. The surge tank damps pressure perturbations and separates the gaseous and liquid phases when the flowing pressure is below the bubble point pressure of the GPGT brine. This ensures a single, liquid phase in-flow to the hydraulic turbine. The surge tank is a simple baffled pressure vessel, capable of withstanding the well's flowing pressure and designed with sufficient liquid free surface area for evolving the gas as required.

1.3. Pelton Turbine and Gas Separator

The surge tank exit brine is passed to a single-nozzle Pelton-type hydraulic turbine for recovering the GPGT well's kinetic energy. The power produced by the turbine is directly proportional to the GPGT flow rate and pressure drop across the turbine. Most of the surface system's pressure drop occurs across the turbine nozzle, which effectively serves as a flow-control choke for the GPGT well. The turbine brine discharges into the main gas separator where gas is further withdrawn. The gas separator pressure (turbine back pressure) can be controlled to govern the composition of the withdrawn gas, e.g., water vapor and $CO_2$ content. The gas so recovered is routed for use in the power branch. The turbine is coupled to a generator for the production of electricity.

1.4. Combined Cycle Power

The gas from the surge tank and separator is routed to a heat engine for the conversion into shaft power for generating electricity (or other requirement, e.g., cogeneration of electricity and steam). In the figures, a combined Brayton-Rankine cycle is depicted (although other cycles could be used), where the discharge heat from the Brayton's gas turbine engine is used for supply heat to a Rankine Cycle engine (e.g., steam turbine) to further generate shaft power for electricity production. In the figure the two cycle engines are shown coupled to a common shaft and generator, although they could drive independent shafts. Example performance projections for the combined cycle are provided in Table I, given representative GPGT gas quality and rates; a 42% efficiency is used for that evaluation (shaft power per input heat), although higher combined cycle efficiencies have been reported (approaching 60%). The Rankine Cycle rejects its waste heat to the spray evaporation pond (SEP), discussed below. Alternately, the discharge heat from the primary heat engine (e.g., Brayton Cycle in the figures) could be routed to augment the GPGT brine heat for ORC power generation.

1.5. Low-Temperature ORC Power

A portion of the degassed brine after the Pelton turbine is routed to a low-temperature Organic Rankine Cycle (ORC) heat engine, where the brine's thermal energy is converted to shaft power to generate electricity (or other suitable mechanical function). The apportionment of the GPGT brine to the low-temp ORC and the MED system, for an example case, is shown in Table I, where also is shown (compared) the amounts of electricity for the example case produced by the three cycles in the power branch of the figures, i.e., Pelton Turbine, Combined Cycle, and Low-Temp ORC. The low-temp ORC likewise rejects its waste heat to the SEP.

1.6. Miscellaneous Systems

The non-integrated system in FIG. 1 will require a dedicated disposal well, or other means for disposing large volumes of unprocessed brine. The integrated system of FIG. 2, the instant invention, will most likely require access to a disposal well, or similar means, for limited use (e.g., bypass during maintenance, etc.). The disposal well is perforated across a suitable aquifer for disposing end-brine. The disposal well is equipped with a pump where over pressuring the disposal aquifer is required. For regular pressured aquifers at modest disposal rates, however, minimal pumping may be required for disposal fluids with sufficiently high specific gravity to assist via over pressure, e.g., partially concentrated end-brine from the SEP. Dependent on the size and quantity of suspended solids, a filter may be required upstream of the disposal well pump to prevent plugging of the disposal aquifer. The non-integrated system shown in FIG. 1 will also require means to reject the waste heat from the power cycles, e.g., cooling towers, as shown in the figure. The cooling towers would be provided with water for evaporative cooling. The pumps and fans to operate the cooling towers, along with the power to operate the disposal pump, would be parasitic loads for the non-integrated system of FIG. 1.

2. Integrated GPGT Brine Concentration System

The instant invention calls for integrating a means to concentrate the end-brine from GPGT-to-electricity operations for beneficial uses. The following discussion generally describes the integrated systems, where more detailed descriptions of the components can be found in the references (e.g., Nitschke, 1999, 2006, 2007).

2.1. Multi-Effect Distillation System

The remaining degassed brine from the Pelton Turbine and gas separator, which is not routed to the power branch, is routed into the Multi-Effect Distillation (MED) unit. The MED concentrates the brine to super saturation and recovers $H_2O$ distillate, while providing heat to the spray evaporation pond (SEP) from condensing the low-pressure steam in the last MED effect. The MED latent heat rejected to the SEP helps promote evaporation concentration of the end-brine from the power branch. The first effects of the MED are typified by thin-film, vertical tube evaporators, whereas the last effect(s) uses forced circulation heat exchangers to evaporate the final concentration to super-saturation, typically 20% suspended solids (by weight), per communication with a manufacturer. The MED design (No. of effects, HX areas) will depend on site specific factors, e.g., GPGT source characteristics and saturated brine requirements. Non-condensable gasses are bled from the higher pressure effects. The super-saturated brine end-product is routed to a mixer where it is mixed with the sub-saturated end-brine from the SEP to yield the final desired brine concentration (e.g., saturated). The $H_2O$ distillate recovered from the MED is nearly pure water (TDS≤5 ppm) which can by vended or also used as build material for the SGSPs (i.e., to build the gradient and top fresh water layers of the SGSP).

2.2. Spray Evaporation Pond

The spray evaporation pond (SEP) provides a sink for the reject heat from the various systems while also serving to concentrate the end-brine from the power branch. The power branch end-brine is routed to the SEP. The SEP has a pump which continually circulates the pond's brine at a high flow rate through a spray nozzle network. The recirculated pond brine is routed through the MED end-effect condenser and the two condensers of the power branch (the Combined Cycle and Low-Temp ORC condensers in FIG. 2) to condense the MED end-effect steam and provide a heat sink for the power cycles, while raising the recirculated brine temperature; heating the recirculated SEP brine greatly enhances evaporation by increasing the difference between the nozzle discharge temperature and the local wet bulb temperature. The recirculation pump controls the recirc-nozzle flow rate and pressure, for a given nozzle specification, which affect the evaporative mass transfer from the SEP to the ambient. Other SEP design performance control features are the nozzle height from the pond surface, nozzle size, and nozzle density. These design features can be adjusted to optimize the SEP performance regionally, e.g., to compensate for diurnal and seasonal ambient changes to humidity, wind, temperature, evaporation, rainfall, and solar loading. Sizing the SEP for the particular site, GPGT source, and final product-brine requirements, along with trim control of the noted SEP mass transfer coefficient parameters (i.e., pump rate and pressure, nozzle density and height) and source heat (heat rejected from the MED and power cycle condensers), will maintain a balanced operation of the SEP system (quasi-constant standing brine volume, with a salinity concentration that either increases with depth, where the end-product can be withdrawn from the SEP bottom, or that can be established by step-wise-with-concentration section isolation within the SEP). Modeling of the SEP is derived and demonstrated in the noted references (Nitschke, 2006, 2007).

2.3. Miscellaneous Systems

In certain cases, the brine streams into or out of the SEP may need to be clarified (clarifier not pictured in the figures) for the removal of undesirable minerals, heavy metals, etc. The clarifier specifications will be site specific. However, generally speaking, GPGT source brines will not require clarification for use in SGSPs. Typical clarifiers discard approximately 5% of the through-flow volume as blowdown (per discussions with vendors), which can be diluted and discarded in the disposal well. In certain cases where the bottoms can be marketed, i.e., processed for surplus chemicals, additional systems would be required, e.g., transfer pumps, on site tank storage, filter pressing equipment, etc. The sub-saturated SEP and super-saturated MED discharge streams are routed to a simple mixer where the final concentration is achieved. Control of the integrated system will require top-level logic that incorporates the various vendor supplied controls to achieve the main objective: optimal power production with the end-brine concentrated to specification. Some of the individual component controls will need to be synthesized and integrated into the overall system control schema.

2.4. Salinity Gradient Solar Ponds

The SGSP technology is not specifically a part of the instant invention, but that technology is briefing described here, for context. The public domain is replete with references regarding SGSP technology (e.g., Lu, et al, 2004). A non-convective, salinity gradient solar pond (SGSP) refers to a shallow body of gradated salt water which provides a simple method for collecting, storing, and delivering on-demand solar thermal energy on a large scale. The SGSP is comprised of three layers, as shown in the figure below: an Upper Convecting Zone (UCZ), a gradient or Non-Convecting Zone (NCZ), and a storage zone or Lower Convecting Zone (LCZ).

The LCZ is composed of saturated salt water. This layer stores solar thermal energy; the solar energy is absorbed by the pond's bottom which then heats the adjacent LCZ layer. As the solar radiation is transmitted through the pond it is attenuated along its path by scattering and absorption. The shorter wavelengths of the solar radiation are transmitted through the pond with little absorption, whereas the longer wavelengths are absorbed within the first few centimeters. Wavelengths longer than infrared are reflected at the pond's surface. Above the saturated LCZ is a salt-gradient layer that is salt-saturated at the bottom and nearly fresh at the top. It is this layer that allows the solar energy to be stored in the bottom LCZ as it maintains the density stratification, i.e., heavier fluid on the bottom of the pond, thereby preventing the convective mass transfer of heat energy via pluming action (as in a conventional pond) from the LCZ. The SGSP is topped with a fresh water layer, the UCZ, which serves as the buffer between the SGSP and the ambient. The temperature difference between the bottom and top layers is typically 70° C. Various methods can be employed for utilizing the SGSP stored thermal energy, e.g., electricity generation via heat engine, thermally powered desalination, absorptive chilling, or other process heat. A comparison of costs and performance for electricity generation, with other renewable energy systems, is provided in Table II, where SGSPs are shown to trade very favorably with other renewable energy recovery methods.

For the continual operation of the integrated system disclosed herein, new SGSP systems (footprint) would continually be built to utilize the end-brine from the GPGT-to-electricity system. For an example system, as noted in Table I, the GPGT-electric system would produce approximately 4 MWe for the life of the GPGT well, with approximately 60 acres of SGSP built annually, as end-brine is processed with the integrated system, equating to 1.2 MWe additional SGSP capacity each year (e.g., for south Texas climate). Hence, say, after a 10 year GPGT well life (typical expectation), the GPGT-electric system would have produced 40 MWe-years, while leaving behind a permanent 12 MWe SGSP instantiation, capable of producing 100's of MWe-years over its (perpetual) life cycle, easily ~10× the 40 MWe-yrs from the GPGT-electricity.

INDUSTRIAL APPLICABILITY

The present invention provides a means for processing and utilizing the waste brine from GPGT-to-electricity systems, namely for bulk material to construct SGSPs. This avoids the costs and environmental impacts of disposing large quantities of raw brine, typically doubling the net revenues for the GPGT-electric operation, while providing a cost-effective source of saturated salt brine for SGSP construction. The GPGT resource is a massive energy resource in the U.S., and world (7 GPGT basins in the U.S. and 60+ others worldwide), and has the potential to become a major piece of the nation's energy portfolio; the present invention, by greatly enhancing the economics of the GPGT-to-electricity conversion, helps enable the development and use of the important GPGT resource. Further the present invention facilitates the cost-effective construction of SGSPs from the GPGT end-brine, which has the potential to produce ~10× the (finite) GPGT-electricity in (perpetual) renewable solar thermal (baseload) electricity, becoming a significant portion of the nation's (global) renewable energy portfolio(s).

REFERENCES

Dorfman, Myron H., "Geopressured-Geothermal Energy And Associated Natural Gas", Proceedings, Eleventh Annual Energy Source Conference and Exhibit, 1988, pp. 97-101

John, C. J.; "Geology of the Gladys McCall Geopressured-Geothermal Prospect, Camaron Parish, Louisiana", Louisiana Geological Survey, 1989.

Lu, H.; Swift, A. H. P.; Hein, H. D. Jr.; Walton, J. C.: "Advancements in Salinity Gradient Solar Pond Technology Based on 16 Years of Operational Experience"; J. Solar Energy Eng., v.126, p. 759-767, May 2004.

Negus-de Wys, J. and Dorfman, M. H.; "The Geopressured-Geothermal Resource: Transition to Commercialization", Proceedings, v.1, Industrial Consortium for the Utilization of the Geopressured-Geothermal Resource, Jan. 10, 1990, pp. 11-39.

Nitschke, G. S.; "System For Using Geopressured-Geothermal Reservoirs", U.S. Pat. Re. 36,282, Aug. 31, 1999.

Nitschke, G. S.; "A Geopressured-Geothermal, Solar Conversion System to Produce Potable Water", Doctoral Dissertation, Mechanical Engineering, University of Massachusetts Lowell, November 2006.

Nitschke, G. S.; U.S. Patent application filing entitled: "Enhanced Oil Recovery System for use With a Geopressured-Geothermal Conversion System", August 2007.

Ramsthaler, J. and Plum, M.; "Future for Geopressured-Geothermal Resources", ASME Geothermal Energy Symposium, Jan. 10-13, 1988.

Rinehart, B. N.; "Geothermal Well Site Restoration and Abandonment of Wells: DOE Gladys McCall Test Site and DOE Willis Hulin Test Site", Idaho National Engineering Laboratory, EG&G Idaho, Inc., Contract DE-AC07-761D01570, August 1994.

Riney, T. D.; "Gladys McCall Geopressured Reservoir Analysis-June 1987", Journal of Energy Resources Technology, v.110, Transactions of the ASME, December 1988.

Riney, T. D.; "Analysis of Preliminary Testing of Willis Hulin Well No. 1", S-Cubed Technical Report for the U.S. Department of Energy Geothermal Division, Lawrence Berkeley Laboratory Contract No. DE-AC03-76SF00098, September 1991.

Riney, T. D. and Owusu, L. A.; "Well Test Analysis and Reservoir Modeling of Geopressured-Geothermal Systems, Includes Topical Reports on Analyses for: Pleasant Bayou Well No. 2 and Gladys McCall Well No. 1", S-Cubed Final Report for the U.S. Department of Energy Geothermal Division, Lawrence Berkeley Laboratory Contract No. DE-AC03-76SF00098, Subcontract No. 4584310, February 1993.

Wallace, R. H. et al; "Assessment of Geopressured-Geothermal Resources in the Northern Gulf of Mexico Basin, Assessment of Geothermal Resources of the United States", U.S. Geological Survey Circular 790, 1978, pp. 132-155.

Example related references from the GPGT Consortium members and various proceedings:

Proceedings of the First Meeting of the Industrial Consortium for the Utilization of the Geopressured-Geothermal Resource, Jan. 10, 1990, Rice University, Houston, Tex.

Biljetina, Richard and Campbell, Richard G., "Surface Production Equipment And Electrical Generation Systems For The Pleasant Bayou Geopressured-Geothermal Well System Brazoria County, Tex.", Proceedings, ASME Eleventh Annual Energy Source Conference and Exhibit, 1988, pp. 89-93

Eaton, B. A.; Featherston, C. R.; Meahl, T. E.; "U.S. Gulf Coast DOE Geopressured-Geothermal Energy Program Field Research Site Operations FY 1986 To Present Accomplishments and Goals", Proceedings, ASME Eleventh Annual Energy Source Conference and Exhibit, 1988, pp. 103-108

Nichols, K. E., "Modular Generation Technology With The Geopressured-Geothermal Resource", Proceedings, Industrial Consortium for the Utilization of the Geopressured-Geothermal Resource, Houston, Tex., 1990, vol. 1, March 1990, pp. 43-49

Tribus, M., "Kalina Cycle System 12 And Cascade Rankine Cycle for Geothermal Power Generation", Proceedings, Industrial Consortium for the Utilization of the Geopressured-Geothermal Resource, Austin, Tex., 1990, vol. 2, February 1991, pp. 153-182

Referenced SMU Geothermal Laboratory presentations can be found at: http://smu.edu/geothermal/Oil&Gas/Oil&GasPresentations.htm

What is claimed is:

1. A method for interfacing with a system that produces electricity from Geopressured-Geothermal (GPGT) brine energy and providing a means for concentrating the end-brine from that system, wherein the GPGT-to-electricity system flows GPGT brine from a well-bore, separates an existent gas, and produces electricity from the GPGT brine energy, the method comprising the steps of;

a. flowing the gas separated from the GPGT brine by the GPGT-to-electricity system to fuel a heat engine to produce working power generate electricity, said heat engine rejects waste heat via heat exchange to a spray evaporation pond (SEP) provided as a system of the said interfacing method;

b. flowing a portion of the degassed GPGT brine produced by the GPGT-to-electricity system to a low-temperature heat engine, said low-temperature heat engine produces shaft power to generate electricity, and said low-temperature heat engine rejects waste heat via heat exchange to the SEP provided as a system of the interfacing method;

c. flowing the remainder of the degassed GPGT brine not routed to the power cycle in step b to a multi-effect distillation (MED) system provided with the interfacing method, where that portion of the brine is distilled to concentrate the end-brine, MED end-effect steam is condensed via heat exchange to the SEP provided as a system of the interfacing method, MED distilled water product is recovered for use, and said MED concentrated brine product is routed to a mixer provided as a system of the interfacing method;

d. flowing the thermally spent brine from step b to the SEP provided by the interfacing method, the SEP continually recirculates the brine through means for recovering the waste heat from steps a, b, and c, thereby thermally augmenting the evaporation in the SEP for the purpose of concentrating the discharge brine from step b to an acceptable concentration, and then routing that concentrated brine to the mixer of step c, to yield the final saturated end-brine product;

e. concentrating a portion of the GPGT brine by the SEP simultaneously while rejecting the waste heat from the heat engines of steps a and b, and the MED; and f. utilizing the final product end-brine from step c for purposes, selected from the group consisting of; including for use as bulk material for the construction of salinity gradient solar ponds (SGSP), and routed for disposal in a disposal well.

2. The method for interfacing with a system that produces electricity from Geopressured-Geothermal (GPGT) brine energy and providing a means for concentrating the end-brine from that system, wherein the GPGT-to-electricity system flows GPGT brine from a well-bore, separates an existent gas, and produces electricity from the GPGT brine energy, of claim 1, wherein the method produces a reduced power output and thereby reduced disposal costs.

3. The method for interfacing with a system that produces electricity from Geopressured-Geothermal (GPGT) brine energy and providing a means for concentrating the end-brine from that system of claim 1 further comprising the step of;

a. integrating the heat engines of steps 1.a and 1.b by the GPGT-to-electricity system, such that the waste heat from the heat engine of step 1.a is combined with the GPGT brine thermal energy input to the heat engine of step 1.b to augment the power produced from the heat engine of step 1.b, said heat engine of step 1.b produces shaft power to generate electricity, and which rejects its waste heat via heat exchange to the spray evaporation pond (SEP) provided as a system of the interfacing method.

4. The method for interfacing with a system that produces electricity from Geopressured-Geothermal (GPGT) brine energy and providing a means for concentrating the end-brine from that system of claim 1 further comprising the step of;

a. routing the gas for step 1.a by the GPGT-to-electricity system for sale, versus use for power production, and no heat is rejected from step 1.a as waste heat to either the heat engine in step 1.b or via heat exchange to the SEP provided as a system of the interfacing method.

5. The method for interfacing with a system that produces electricity from Geopressured-Geothermal (GPGT) brine energy and providing a means for concentrating the end-brine from that system of claim 1 further comprising the step of;

a. routing the gas for step 1.a by the GPGT-to-electricity system to a means for providing heat via direct burn to combine with the GPGT brine thermal energy input to the heat engine of step 1.b to augment the power produced from the heat engine of step 1.b, which heat engine produces shaft power to generate electricity, and which rejects its waste heat via heat exchange to the SEP provided as a system of the interfacing method.

\* \* \* \* \*